United States Patent
Hanlon et al.

(10) Patent No.: US 11,680,531 B2
(45) Date of Patent: *Jun. 20, 2023

(54) ADAPTIVE BLEED SCHEDULE IN A GAS TURBINE ENGINE

(71) Applicant: Raytheon Technologies Corporation, Farmington, CT (US)

(72) Inventors: Christopher J. Hanlon, Sturbridge, MA (US); James F. Krenzer, Manchester, CT (US); Becky E. Rose, Colchester, CT (US); Mark F. Zelesky, Bolton, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/682,313

(22) Filed: Feb. 28, 2022

(65) Prior Publication Data

US 2022/0307427 A1 Sep. 29, 2022

Related U.S. Application Data

(63) Continuation of application No. 16/168,943, filed on Oct. 24, 2018, now Pat. No. 11,261,800.

(51) Int. Cl.
*F02C 9/18* (2006.01)
*F02C 6/08* (2006.01)
(Continued)

(52) U.S. Cl.
CPC .................. *F02C 9/18* (2013.01); *F02C 6/08* (2013.01); *F02C 7/052* (2013.01); *F02C 7/057* (2013.01);
(Continued)

(58) Field of Classification Search
CPC ......... F05D 2260/606; F05D 2260/607; F05D 2270/11; F05D 2270/114; F02C 9/18;
(Continued)

(56) References Cited

U.S. PATENT DOCUMENTS

| 3,688,504 A | 9/1972 | Hutchinson et al. |
| 4,463,552 A | 8/1984 | Monhardt et al. |

(Continued)

FOREIGN PATENT DOCUMENTS

| EP | 0284392 A2 | 9/1988 |
| EP | 3260687 A1 | 12/2017 |
| WO | 2018128790 A1 | 12/2018 |

OTHER PUBLICATIONS

EP Application No. 19205195.1 Extended EP Search Report dated Mar. 19, 2020, 7 pages.

(Continued)

*Primary Examiner* — Scott J Walthour
*Assistant Examiner* — David P. Olynick
(74) *Attorney, Agent, or Firm* — Cantor Colburn LLP

(57) ABSTRACT

An aspect includes a system for a gas turbine engine. The system includes one or more bleeds of the gas turbine engine and a control system configured to check one or more activation conditions of a dirt rejection mode in the gas turbine engine. A bleed control schedule of the gas turbine engine is adjusted to extend a time to hold the one or more bleeds of the gas turbine engine partially open at a power setting above a threshold based on the one or more activation conditions. One or more deactivation conditions of the dirt rejection mode in the gas turbine engine are checked. The dirt rejection mode is deactivated to fully close the one or more bleeds based on the one or more deactivation conditions.

20 Claims, 8 Drawing Sheets

(51) Int. Cl.
  *F02C 7/052* (2006.01)
  *F02C 7/057* (2006.01)
  *F02C 9/44* (2006.01)
  *F02K 3/075* (2006.01)
  *F04D 27/02* (2006.01)

(52) U.S. Cl.
  CPC ............... *F02C 9/44* (2013.01); *F02K 3/075* (2013.01); *F04D 27/0215* (2013.01); *F05D 2260/606* (2013.01); *F05D 2260/607* (2013.01)

(58) Field of Classification Search
  CPC .......... F02C 6/08; F02K 3/02; F04D 27/0215; F01D 17/105; F01D 21/10; B64D 2033/0246
  See application file for complete search history.

(56) References Cited

U.S. PATENT DOCUMENTS

| | | | |
|---|---|---|---|
| 4,991,389 A | 2/1991 | Schafer | |
| 5,044,153 A | 9/1991 | Mouton | |
| 5,279,109 A | 1/1994 | Liu et al. | |
| 5,515,673 A | 5/1996 | Leclerco et al. | |
| 6,481,210 B1 | 11/2002 | Chapman | |
| 7,802,433 B2 | 9/2010 | Higgins | |
| 7,891,163 B2 | 2/2011 | Richards | |
| 8,074,498 B2 | 12/2011 | Agrawal et al. | |
| 8,204,671 B2 | 6/2012 | Agrawal et al. | |
| 8,256,277 B2 | 9/2012 | Khibnik et al. | |
| 8,424,279 B2 | 4/2013 | Rajamani et al. | |
| 8,475,115 B2 | 7/2013 | Zhang et al. | |
| 9,046,056 B2 | 6/2015 | Lerg | |
| 9,518,513 B2 | 12/2016 | Pritchard, Jr. et al. | |
| 9,718,562 B1 | 8/2017 | Fisher et al. | |
| 9,909,497 B2 | 3/2018 | Feulner et al. | |
| 9,915,176 B2 | 3/2018 | Murray et al. | |
| 9,945,260 B2 | 4/2018 | Lukowski et al. | |
| 9,982,598 B2 | 5/2018 | Pritchard, Jr. et al. | |
| 10,286,407 B2 | 5/2019 | Correia et al. | |
| 10,287,992 B2 | 5/2019 | Tan et al. | |
| 10,393,128 B2 | 8/2019 | Urac et al. | |
| 10,724,398 B2 | 7/2020 | Zhang et al. | |
| 2010/0162682 A1 | 7/2010 | Lerg | |
| 2014/0109589 A1 | 4/2014 | Pritchard, Jr. et al. | |
| 2015/0345331 A1 | 12/2015 | Murray et al. | |
| 2016/0045923 A1 | 2/2016 | Correia et al. | |
| 2016/0123154 A1 | 5/2016 | Manning et al. | |
| 2016/0153314 A1 | 6/2016 | Lukowski et al. | |
| 2016/0348685 A1 | 12/2016 | Urac et al. | |
| 2017/0058783 A1 | 3/2017 | Tan et al. | |
| 2017/0121028 A1 | 5/2017 | Visser et al. | |
| 2018/0073386 A1 | 3/2018 | Zhang et al. | |
| 2018/0073389 A1 | 3/2018 | Zhang et al. | |
| 2018/0252184 A1 | 9/2018 | Hatim | |
| 2019/0005826 A1 | 1/2019 | Lax et al. | |
| 2019/0277200 A1 | 9/2019 | Mistry | |
| 2020/0010211 A1 | 1/2020 | Eburderie | |
| 2020/0131996 A1 | 4/2020 | Hanlon et al. | |
| 2020/0131997 A1 | 4/2020 | Hanlon et al. | |

OTHER PUBLICATIONS

EP Application No. 19205202.5 Extended EP Search Report dated Mar. 27, 2020, 6 pages.

ADAPTIVE BLEED SCHEDULE IN A GAS TURBINE ENGINE

CROSS-REFERENCE TO RELATED APPLICATIONS

This application is a Continuation of U.S. patent application Ser. No. 16/168,943 filed Oct. 24, 2018, the disclosure of which is incorporated herein by reference in its entirety.

BACKGROUND

The subject matter disclosed herein generally relates to engine systems and, more particularly, to a method and apparatus for an adaptive bleed schedule in a gas turbine engine.

Engines, such as gas turbine engines, can operate in unclean environments that result in ingestion of dust, dirt, and debris. Particulate matter can accumulate within an engine as it operates over a period of time. The particulate matter can result in degraded performance, such as thrust reduction, excess fuel consumption, and possible component life reduction. Regular engine cleaning can remove environmental particulate matter; however, cleaning and servicing based on a predetermined time interval may result in premature or late actions relative to the actual condition of an engine.

BRIEF DESCRIPTION

According to one embodiment, a system for a gas turbine engine includes one or more bleeds of the gas turbine engine and a control system configured to check one or more activation conditions of a dirt rejection mode in the gas turbine engine. A bleed control schedule of the gas turbine engine is adjusted to extend a time to hold the one or more bleeds of the gas turbine engine partially open at a power setting above a threshold based on the one or more activation conditions. One or more deactivation conditions of the dirt rejection mode in the gas turbine engine are checked. The dirt rejection mode is deactivated to fully close the one or more bleeds based on the one or more deactivation conditions.

In addition to one or more of the features described above or below, or as an alternative, further embodiments may include where the dirt rejection mode is activated based on meeting all of the one or more activation conditions, and the dirt rejection mode is deactivated based on meeting at least one of the one or more deactivation conditions.

In addition to one or more of the features described above or below, or as an alternative, further embodiments may include where the one or more activation conditions include detecting that the gas turbine engine is incorporated in an aircraft on the ground and an engine speed command of the gas turbine engine is less than a full maximum takeoff thrust setting with a thrust margin.

In addition to one or more of the features described above or below, or as an alternative, further embodiments may include where the one or more activation conditions include confirming that the gas turbine engine is not located in a production test cell.

In addition to one or more of the features described above or below, or as an alternative, further embodiments may include where the one or more deactivation conditions include determining that an altitude of the aircraft is above an altitude threshold, determining that a time since activation is greater than a time threshold, and determining that the engine speed command of the gas turbine engine is greater than the full maximum takeoff thrust setting with the thrust margin.

In addition to one or more of the features described above or below, or as an alternative, further embodiments may include where the one or more deactivation conditions include determining that a go-around mode is active and determining that a synthesized interstage turbine temperature is greater than a temperature threshold.

In addition to one or more of the features described above or below, or as an alternative, further embodiments may include where the control system is further configured to adjust a power setting of the gas turbine engine to compensate for holding the one or more bleeds of the gas turbine engine partially open.

In addition to one or more of the features described above or below, or as an alternative, further embodiments may include where the one or more bleeds are between a low pressure compressor and a high pressure compressor of the gas turbine engine.

In addition to one or more of the features described above or below, or as an alternative, further embodiments may include where adjusting the bleed control schedule is further based on one or more of: an ambient air temperature, an interstage turbine temperature, an exhaust gas temperature, a derate setting, an engine speed, and a thrust specific fuel consumption of the gas turbine engine.

In addition to one or more of the features described above or below, or as an alternative, further embodiments may include where one or more configuration parameters of the dirt rejection mode are set responsive to an input from a data storage unit to the control system.

According to another embodiment, a method of adaptive bleed scheduling in a gas turbine engine is provided. The method includes checking one or more activation conditions of a dirt rejection mode in the gas turbine engine, adjusting a bleed control schedule of the gas turbine engine to extend a time to hold one or more bleeds of the gas turbine engine partially open at a power setting above a threshold based on the one or more activation conditions, checking one or more deactivation conditions of the dirt rejection mode in the gas turbine engine, and deactivating the dirt rejection mode to fully close the one or more bleeds based on the one or more deactivation conditions.

A technical effect of the apparatus, systems and methods is achieved by providing an adaptive bleed schedule in a gas turbine engine as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
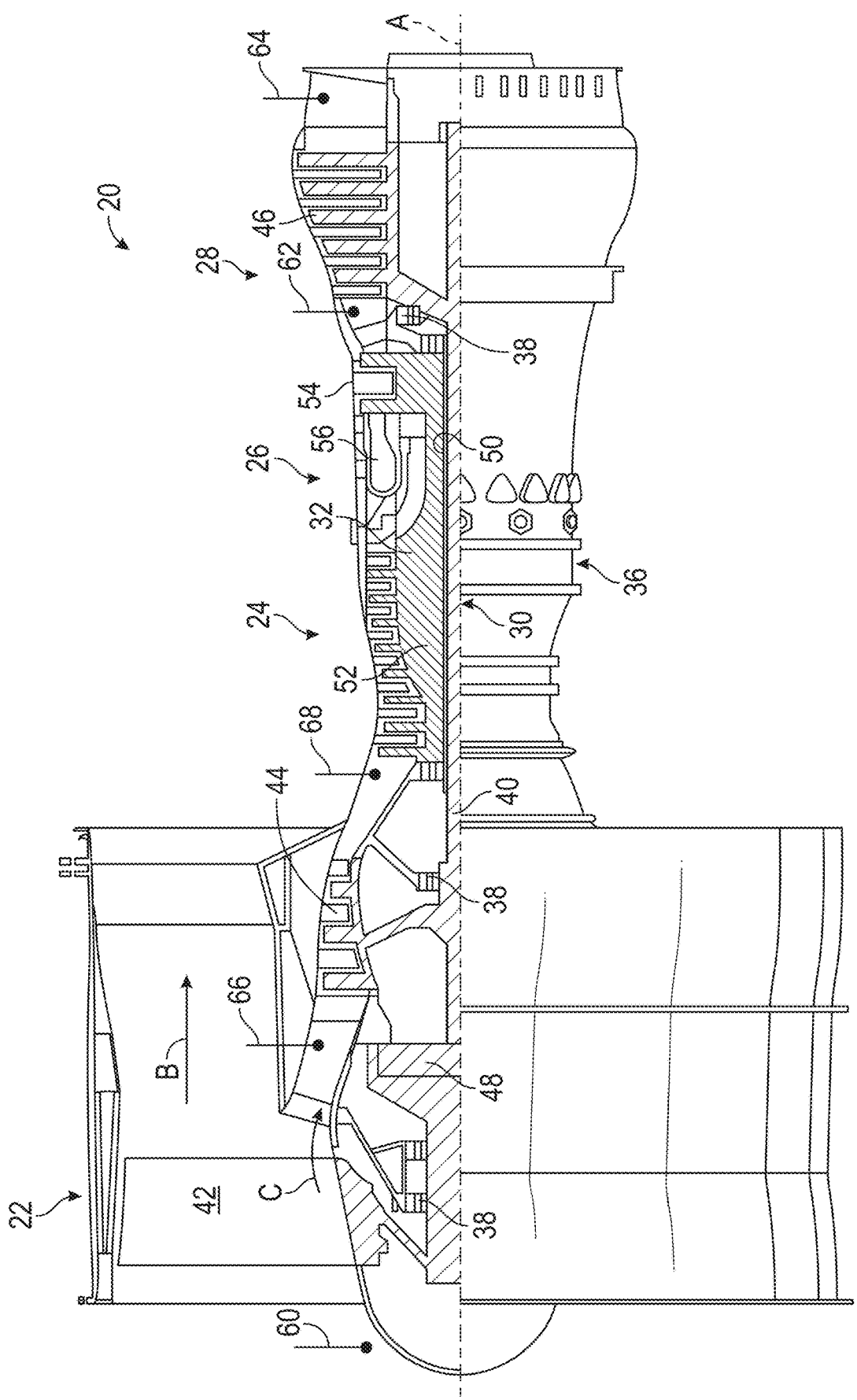
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ °R)/(518.7°R)]^0.5$. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

A number of temperature and/or pressure sensors can be installed at various locations within the gas turbine engine 20. For example, ambient temperature can be determined a station 60 in front of the fan section 22. An interstage turbine temperature (ITT) can be determined at station 62 between the high pressure turbine 54 and the low pressure turbine 46. An exhaust gas temperature (EGT) can be determined at station 64 downstream of the low pressure turbine 46. The gas turbine engine 20 can also include one or more particle sensors 66, which may be installed at an inlet of the low pressure compressor 44 of the gas turbine engine 20 downstream of the fan 42 of the gas turbine engine 20. The gas turbine engine 20 can also include a plurality of bleeds 68 between the low pressure compressor 44 and the high pressure compressor 52 of the gas turbine engine 20. The bleeds 68 (also referred to as 2.5 bleeds) can include a plurality of valves that are selectively opened to control operational performance of the gas turbine engine 20 (e.g., venting a gas path). In embodiments, the bleeds 68 can be used to reject environmental particulates (e.g., dirt) during flight and prevent the environmental particulates from reaching the engine core (e.g., combustor section 26). Embodiments, as further described herein, use data from a variety of sources to optimize opening times of the bleeds 68 to improve/maximize performance of fuel burn, time on wing, ice rejection, dirt rejection, and margin for EGT and/or ITT during operation of the gas turbine engine 20.

Figure 2:
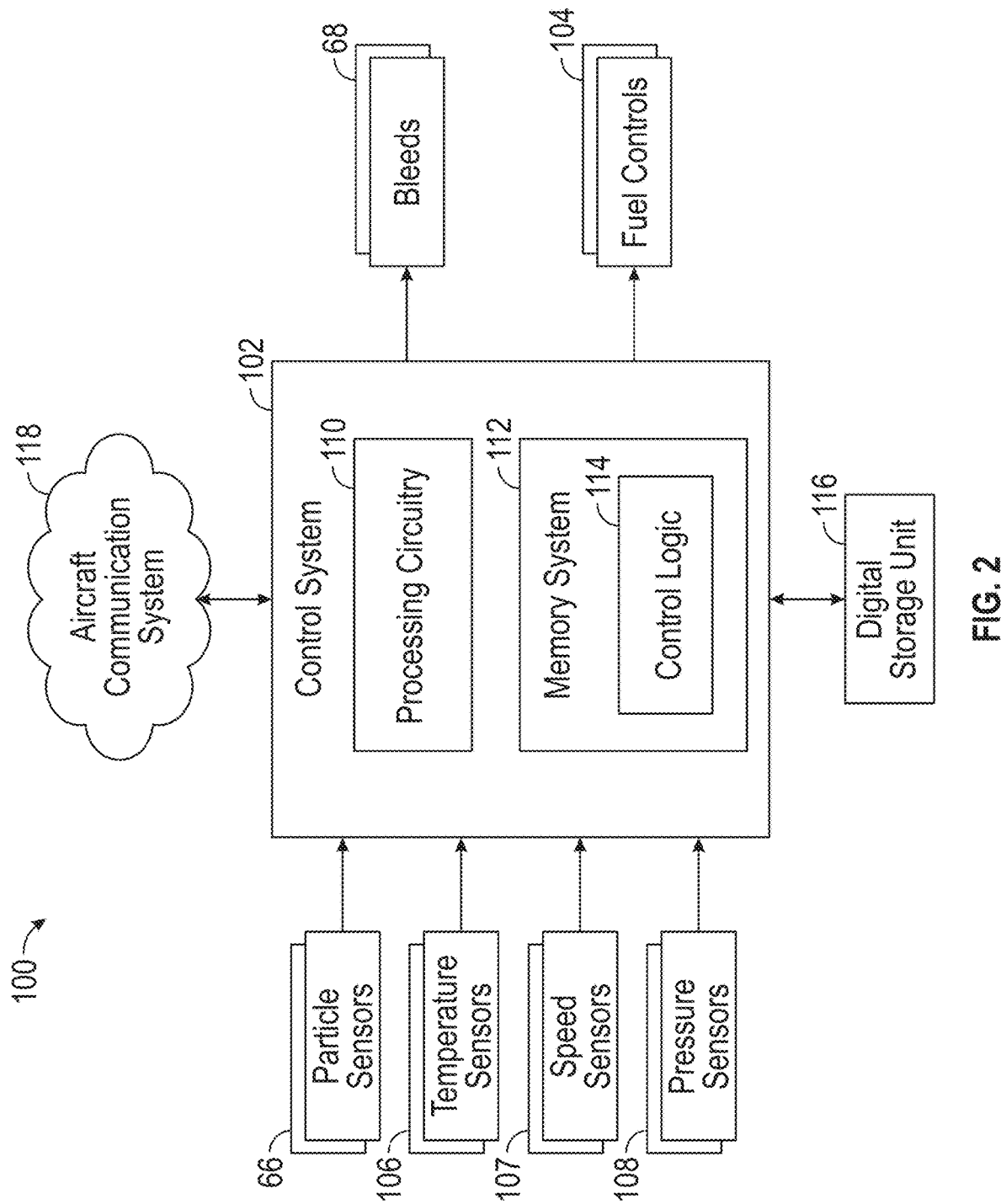
FIG. 2 is a schematic diagram of a dirt mitigation system, in accordance with an embodiment of the disclosure.

FIG. 2 illustrates a dirt mitigation system 100 that includes a control system 102 that can control opening of the bleeds 68 of the gas turbine engine 20 of FIG. 1. The control system 102 may also interface with fuel controls 104 to meter delivery of fuel to the combustor 56 of FIG. 1. The control system 102 can receive sensor data from various sensors, such as particle sensors 66, temperature sensors 106, speed sensors 107, pressure sensors 108, and/or other sensors (not depicted). The temperature sensors 106 and/or pressure sensors 108 can be located at various stations throughout the gas turbine engine 20, such as stations 60, 62, 64 of FIG. 1, and other such locations. The speed sensors 107 can detect the speed of various rotating components, such as the low speed spool 30, high speed spool 32, and/or fan 42. In some embodiments, the particle sensors 66 can be omitted, and particle data can be received or derived from other data sources, such as data received from an aircraft communication system 118. Other sensed parameters can be received on the aircraft communication system 118, such as an aircraft on-ground indicator (e.g., weight-on-wheels), aircraft altitude above ground level, thrust commands, and other such values.

The control system 102 can include processing circuitry 110 and a memory system 112 to store data and instructions that are executed by the processing circuitry 110. The executable instructions may be stored or organized in any manner and at any level of abstraction, such as in connection with a controlling and/or monitoring operation of the dirt mitigation system 100 and/or other aspects of the gas turbine engine 20. The processing circuitry 110 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 112 may include random access memory (RAM), read only memory (ROM), or other electronic, optical, magnetic, or any other computer readable medium onto which is stored data and algorithms in a non-transitory form. The control system 102 is operable to access sensor data for use by control logic 114 in the memory system 112, which may be executed by the processing circuitry 110 to control the bleeds 68 and/or fuel controls 104. The control system 102 can include other interfaces (not depicted), such as various inputs, outputs, communication interfaces, power systems, and the like. The control system 102 can also receive one or more configuration parameters as input from a data storage unit 116 to enable, disable, and/or otherwise configure functionality of the control system 102. Further, the control system 102 can write values back to the data storage unit 116 for long-term storage and subsequent analysis.

Figure 3:
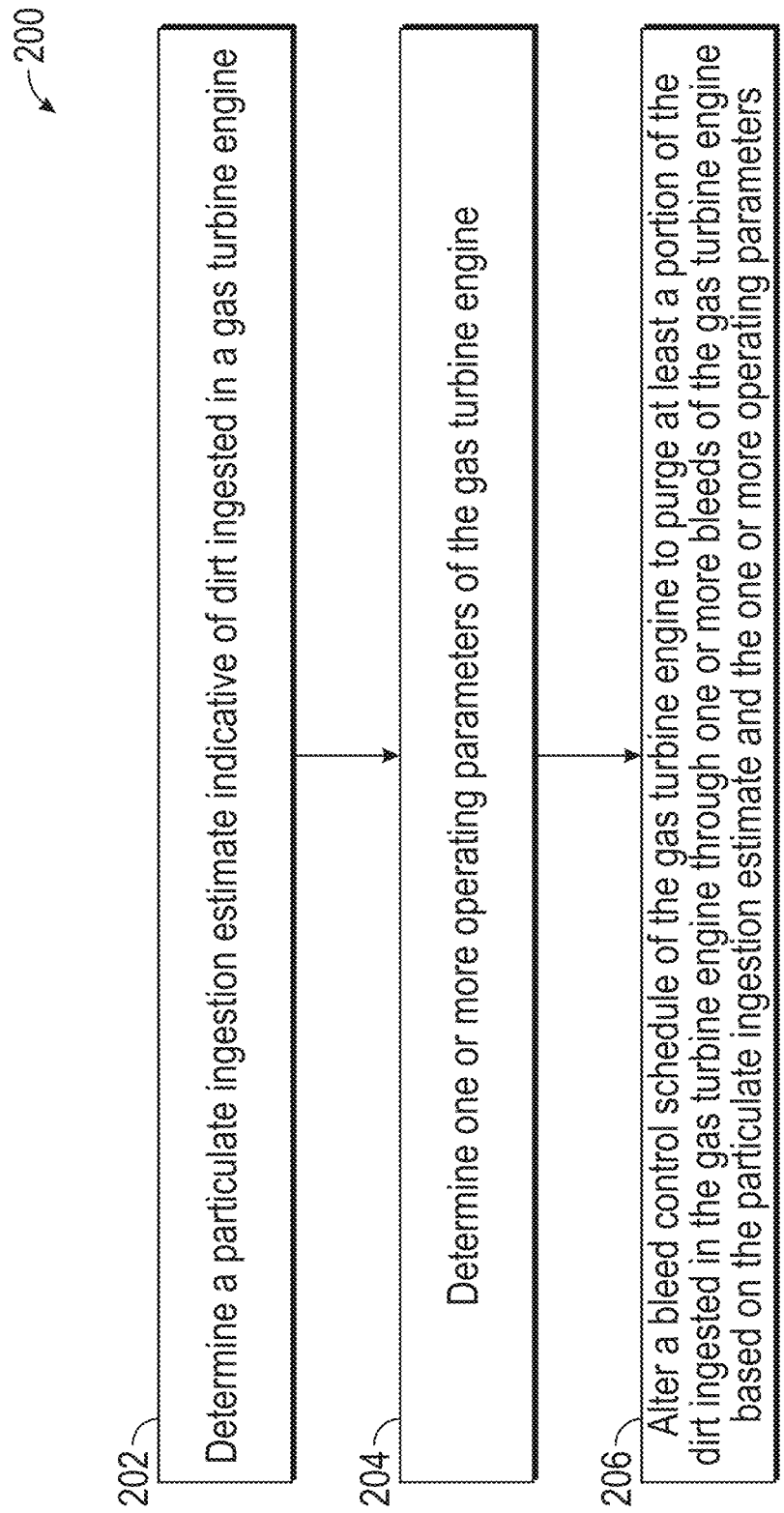
FIG. 3 is a flow chart illustrating a method, in accordance with an embodiment of the disclosure.

Referring now to FIG. 3 with continued reference to FIGS. 1 and 2, FIG. 3 is a flow chart illustrating a method 200 of dirt mitigation in a gas turbine engine 20, in accordance with an embodiment. The method 200 may be performed, for example, by the dirt mitigation system 100 of FIG. 2. For purposes of explanation, the method 200 is described primarily with respect to the dirt mitigation system 100; however, it will be understood that the method 200 can be performed on other configurations (not depicted).

At block 202, the control system 102 can determine a particulate ingestion estimate indicative of dirt ingested in the gas turbine engine 20. The particulate ingestion estimate can be determined based on a plurality of particle sensor data from the gas turbine engine 20, for instance, as received from the particle sensors 66 or the aircraft communication system 118. In some embodiments, the particle sensor data may be derived from a combination of observed environmental conditions and look-up tables based on, for example, the location of the gas turbine engine 20 and an environmental parameter associated with the location. For instance, particulate tables may define particle data values observed in particular locations, at particular altitudes, and time-of-year to estimate likely particulate ingestion as an aircraft that includes the gas turbine engine 20 has an exposure time through the environment, where, for example, particle sensors 66 are unavailable or non-operational.

At block 204, the control system 102 can determine one or more operating parameters of the gas turbine engine 20. The one or more operating parameters of the gas turbine engine 20 can include one or more of: a flight segment (e.g., take-off, climb, cruise, descent, thrust reverse), a fuel consumption rate, an operating margin of the gas turbine engine 20, and/or other parameters.

At block 206, the control system 102 can alter a bleed control schedule of the gas turbine engine 20 to purge at least a portion of the dirt ingested in the gas turbine engine 20 through one or more bleeds 68 of the gas turbine engine 20 based on the particulate ingestion estimate and the one or more operating parameters. Altering of the bleed control schedule can be further based on one or more of: an ambient air temperature, an interstage turbine temperature, an exhaust gas temperature, a derate setting, a thrust specific fuel consumption of the gas turbine engine, and/or other values. The control system 102 can revert to a default bleed control schedule of the gas turbine engine 20 based on detection of a fault associated with the dirt mitigation system 100, such as a failure of the particle sensors 66.

While the above description has described the flow process of FIG. 3 in a particular order, it should be appreciated that unless otherwise specifically required in the attached claims that the ordering of the steps may be varied.

Figure 4:
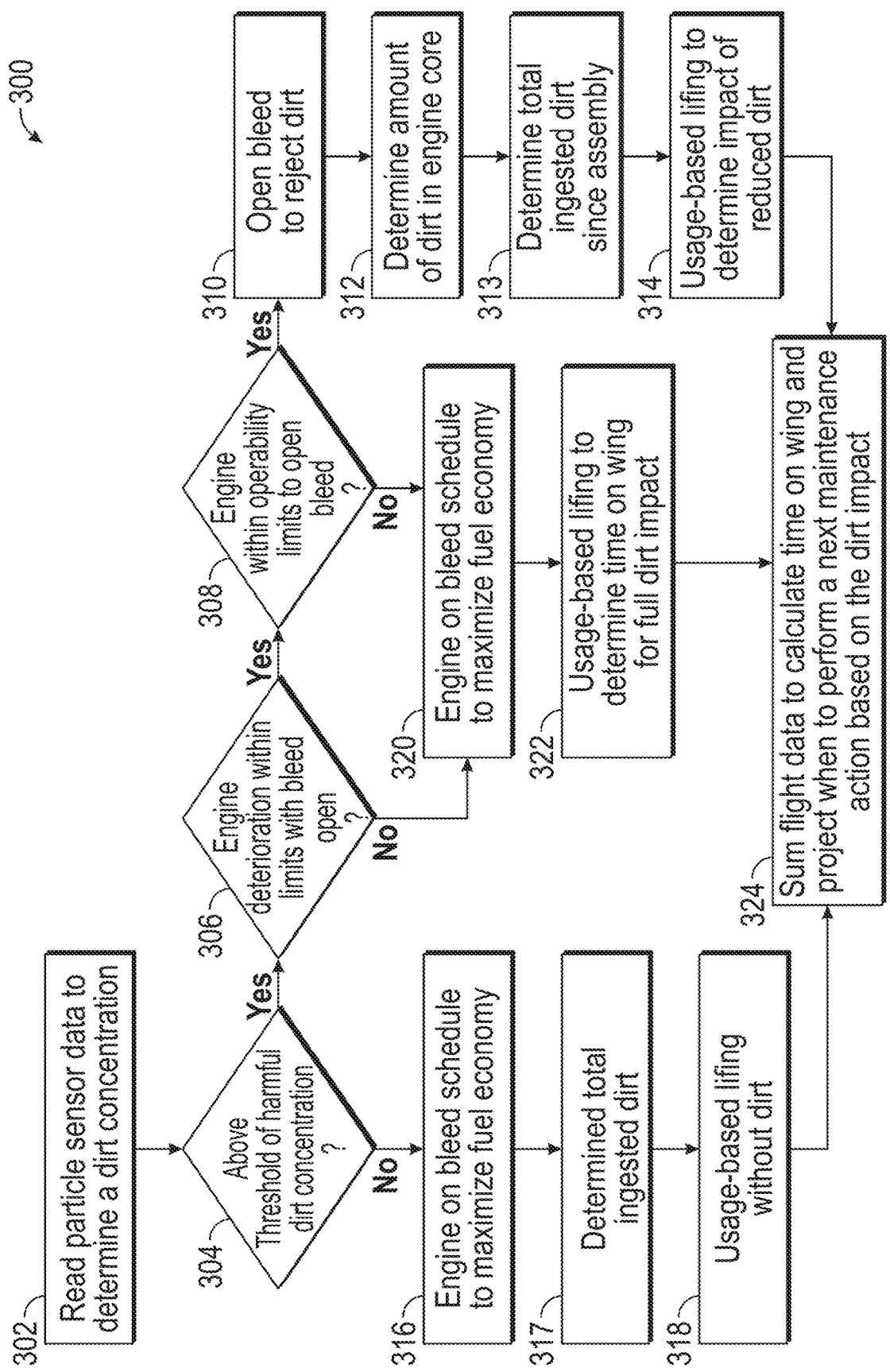
FIG. 4 is a flow chart illustrating a method, in accordance with an embodiment of the disclosure.

Referring now to FIG. 4 with continued reference to FIGS. 1-3, FIG. 4 is a flow chart illustrating a method 300 of dirt mitigation in a gas turbine engine 20, in accordance with an embodiment. The method 300 expands upon the method 200 of FIG. 3 as a further example. The method 300 may be performed, for example, by the dirt mitigation system 100 of FIG. 2. For purposes of explanation, the method 300 is described primarily with respect to the dirt mitigation system 100; however, it will be understood that the method 300 can be performed on other configurations (not depicted).

At block 302, the control system 102 can read particle sensor data to determine a dirt concentration, which may be expressed, for example, as milligrams per cubic meter or other such units of measurement. At block 304, the control system 102 determines whether the particle sensor data indicates that a dirt concentration is above a threshold that is considered a harmful dirt concentration, and if so, the method 300 advances to block 306.

At block 306, the control system 102 can determine whether engine deterioration is within a deterioration limit, and if so, the method 300 advances to block 308. Engine deterioration can be quantified, for example, by comparing measured temperatures at stations of the gas turbine engine 20, and comparing the results to expected values to determine whether performance meets expected margins. Metal temperature within the gas turbine engine 20 can increase as a function of accumulated dirt in combination with engine parameters and environmental effects. Dirt build-up increases backside resistance in a heat transfer network, which can yield a higher temperature as time goes on for a given set of performance characteristics.

At block 308, the control system 102 determines whether the gas turbine engine 20 is within an operability limit prior to altering the bleed control schedule, and if so, the method 300 advances to block 310. Operability limits can include constraints on when dirt rejection using the bleeds 68 can be performed. For example, if an aircraft that incorporates the gas turbine engine 20 is heavily loaded (e.g., high weight) and it is a hot day (e.g., 105 degrees F.), then there may not be sufficient margin to use the bleeds 68 for dirt rejection. However, if the ambient temperature is colder, (e.g., 40 degrees F.), there may be enough margin to support opening of the bleeds 68 for dirt rejection without safety concerns or excessive fuel burn. Thus, there is a balance between dirt level, performance reduction aspects, and operability impact in determining when to open bleeds 68 to reject dirt at block 310.

After opening the bleeds 68 to reject dirt at block 310, at block 312, the control system 102 can determine an amount of dirt in the engine core. Dirt accumulation can be determined based on particle sensor data since a last cleaning event. Opening of the bleeds 68 can reject a portion of the dirt according to a rejection efficiency. At block 313, a total amount of ingested dirt since assembly can be computed, for example, by computing sensed dirt and adjusting for bleed purging effects since the gas turbine engine 20 was assembled and/or fully cleaned. At block 314, usage-based lifing computations can determine the impact of dirt reduction associated with purging at least a portion of the dirt ingested in the gas turbine engine 20, such as future servicing of components within the gas turbine engine 20. Usage based lifing can track durability modes effecting time on wing due to environmental impacts from sources such as salt, fine dirt, dust, and other particles. Lifing durability modes can include, for example, corrosion of alloys and coatings, oxidation, calcium-magnesium-aluminum-silicon attack of thermal barrier coatings, and stress corrosion cracking. The lifing durability modes can be temperature and environmental effect dependent. Damage related to each mode can be computed at time intervals for each effected part of the gas turbine engine 20. The summation of time points can be performed using Miner's rule, for instance, as a cumulative damage model to determine life used up until the current time (e.g., usage based life).

Returning to block 304, if the control system 102 determines that the particle sensor data indicates that a dirt concentration is below the threshold, at block 316, the control system 102 can maintain the bleed control schedule to maximize fuel economy. At block 317, the control system 102 can determine a total amount of dirt ingested using particle sensor data. At block 318, usage-based lifing can be performed to determine component servicing without regard to dirt. Usage-based lifing can use total dirt data up to the time of the lifing calculations and adjust temperature effects due to dirt ingested, if needed to account for dirt accumulation and purging effects.

At block 306 if the engine deterioration is outside of the deterioration limit, or at block 308, if the gas turbine engine 20 is outside of the operability limit, then the method 300 advances to block 320. At block 320, the control system 102 can maintain the bleed control schedule to maximize fuel economy. At block 322, one or more usage-based lifing computations can be performed to determine a time on wing for full dirt impact. At block 324, a summation of flight data (e.g., from blocks 314, 318, 322) can be used to calculate time on wing and project a next maintenance action needed for the gas turbine engine 20 based on the dirt impact. The buildup of dirt data can be used in combination with engine parameters, such as compressor exit temperature, pressure, fuel air ratio, combustor exit temperature, and other such parameters to determine lifing effects and determine when cleaning, inspection, or other servicing will likely be needed. Total dirt data can be used to debit life at a given temperature across durability modes. As the amount of dirt increases during each time interval, the time it takes at a given temperature for thermal barrier coatings to spall can decrease, the time to corrode can decrease, and the time to oxidize can decrease.

While the above description has described the flow process of FIG. 4 in a particular order, it should be appreciated that unless otherwise specifically required in the attached claims that the ordering of the steps may be varied.

Figure 5:
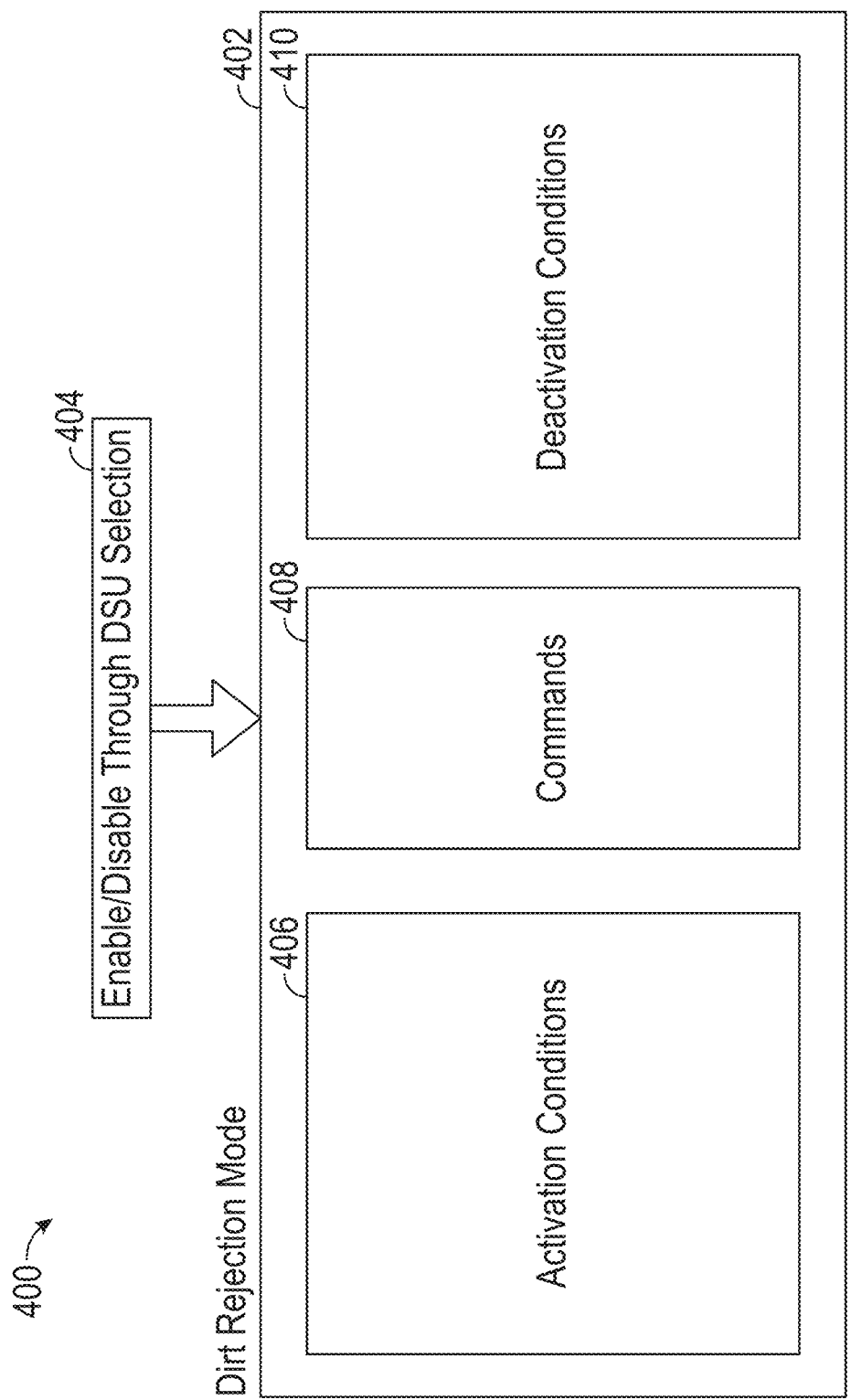
FIG. 5 is a block diagram of a system, in accordance with an embodiment of the disclosure.

FIG. 5 depicts a system 400 that can be incorporated as part of the dirt mitigation system 100 of FIG. 2. For example, dirt rejection mode logic 402 may be activated in a dirt rejection mode as part of the control logic 114 of FIG. 2. The dirt rejection mode logic 402 can be enabled or disabled based on a selection 404 of the data storage unit 116 of FIG. 2 or an alternate input source (not depicted). The selection 404 of the data storage unit 116 can also include one or more configuration parameters of the dirt rejection mode logic 402, such as threshold values, offsets, default values, and other such values. The dirt rejection mode logic 402 can define one or more activation conditions 406 that result in one or more commands 408 to adjust a bleed control schedule of the gas turbine engine 20 of FIG. 1. The dirt rejection mode logic 402 can also define one or more deactivation conditions 410 that result changing or halting the one or more commands 408 to restore the bleed control schedule of the gas turbine engine 20 and/or fully close the bleeds 68.

In embodiments, the one or more activation conditions 406 can enable the control system 102 of FIG. 2 to adjust the bleed control schedule of the gas turbine engine 20 to extend a time to hold the one or more bleeds 68 of the gas turbine engine 20 partially open at a power setting above a threshold based on the one or more activation conditions 406. The one or more activation conditions 406 can leverage aircraft fleet historical data in setting the threshold and other parameters according to typical derating of a maximum takeoff thrust setting under a variety of operating conditions.

Figure 6:
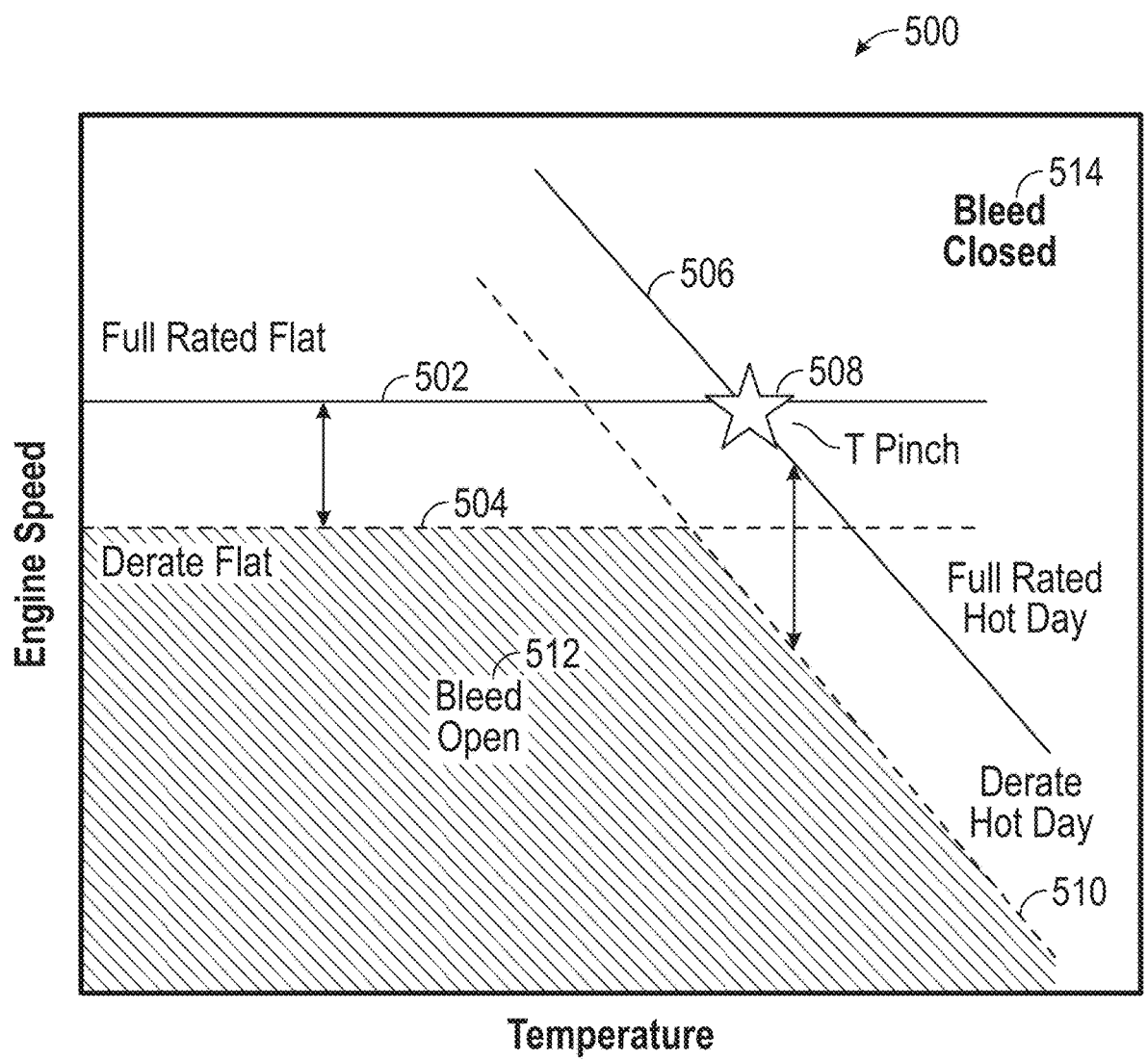
FIG. 6 is a plot of engine speed versus temperature, in accordance with an embodiment of the disclosure.
Figure 7:
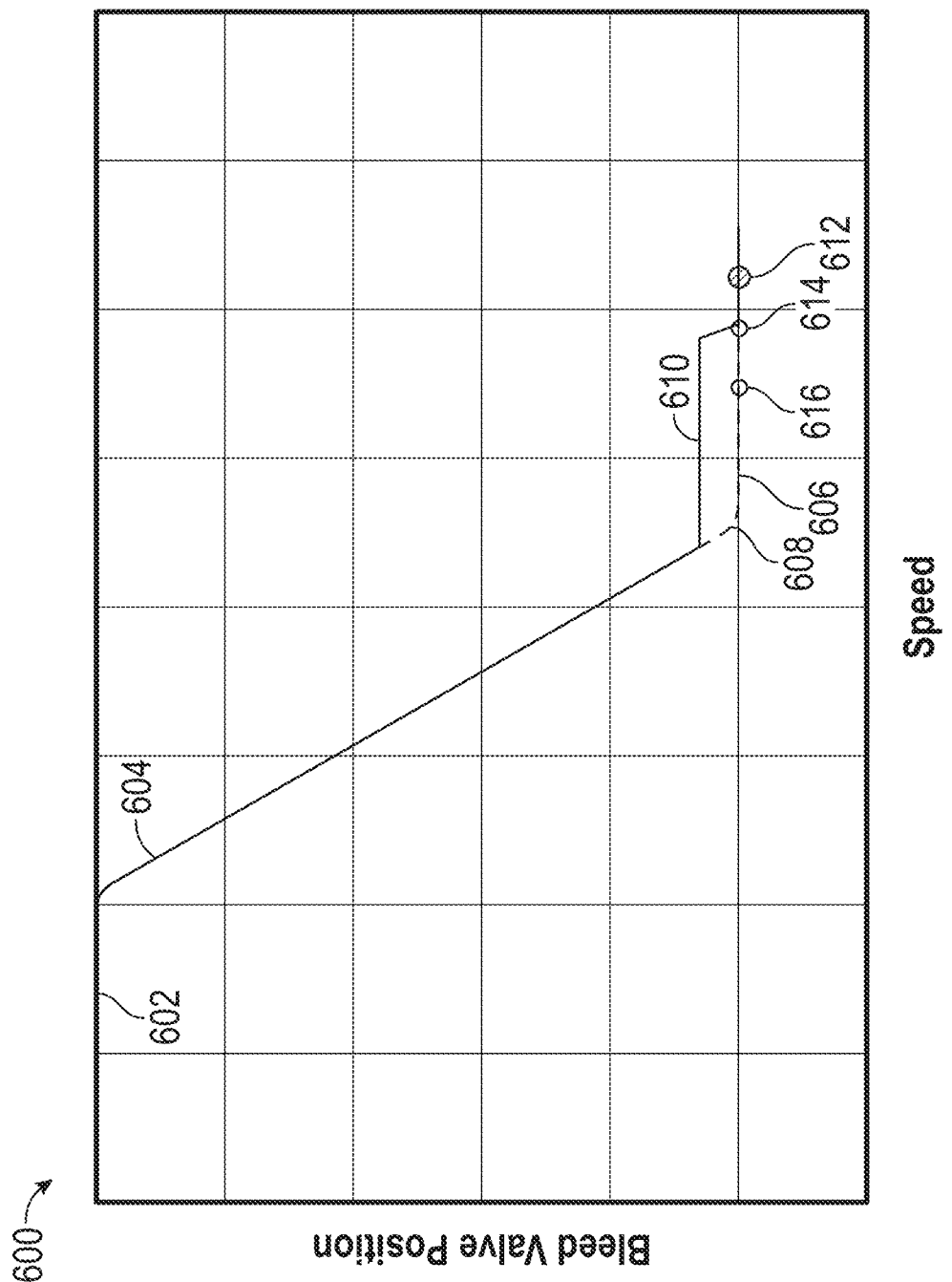
FIG. 7 is a plot of bleed valve position versus speed, in accordance with an embodiment of the disclosure.

FIGS. 6 and 7 illustrate derating and example plots 500, 600 relative to holding the one or more bleeds 68 partially open. Opening of bleeds 68 can be limited, for example, by engine speed and engine temperature. Conditions under which an aircraft needs to achieve a full maximum takeoff thrust setting 502 can depend on aircraft weight, temperature conditions, and other factors (e.g., component damage). Where an aircraft is not fully loaded to maximum weight capacity, for instance, a derated thrust setting 504 can be used, where a lower power level and engine speed of the gas turbine engine 20 of FIG. 1 may be sufficient for achieving takeoff power of an aircraft. As temperature rises, operating temperature margins can be reduced. A full-rated hot day limit 506 can define an outer limit that restricts a maximum engine speed as temperature increases. A thermal pinch point 508 is defined at an intersection of the full maximum takeoff thrust setting 502 and the full-rated hot day limit 506. The derated thrust setting 504 also results in a corresponding derated hot day limit 510. A bleed open region 512 is bounded by the derated thrust setting 504 and the derated hot day limit 510, where the one or more bleeds 68 can be opened. A bleed closed region 514 is defined as an area outside of the bleed open region 512, where the one or more bleeds 68 are closed for maximizing performance of the gas turbine engine 20.

As illustrated in plot 600, bleeds 68 of FIG. 1 can transition from a fully opened position 602 at lower speeds and ramp 604 towards a fully closed position 606 at higher speeds of the gas turbine engine 20 of FIG. 1. Rather than fully closing the bleeds 68 at a power setting above a threshold 608, the one or more bleeds 68 can be held in a partially open position 610 such that dirt can be rejected at a higher power setting, for instance during takeoff where dirt is more likely to be ingested. As one example, the partially open position 610 can be about six percent open. Derating below a full maximum takeoff thrust setting 612, such as a ten percent derating 614 or a twenty percent derating 616 can provide temperature margin as a maximum temperature is limited to a reduced value at lower engine speeds. Keeping one or more bleeds 68 in the partially open position 610 can trade ITT margin for dirt rejection.

Figure 8:
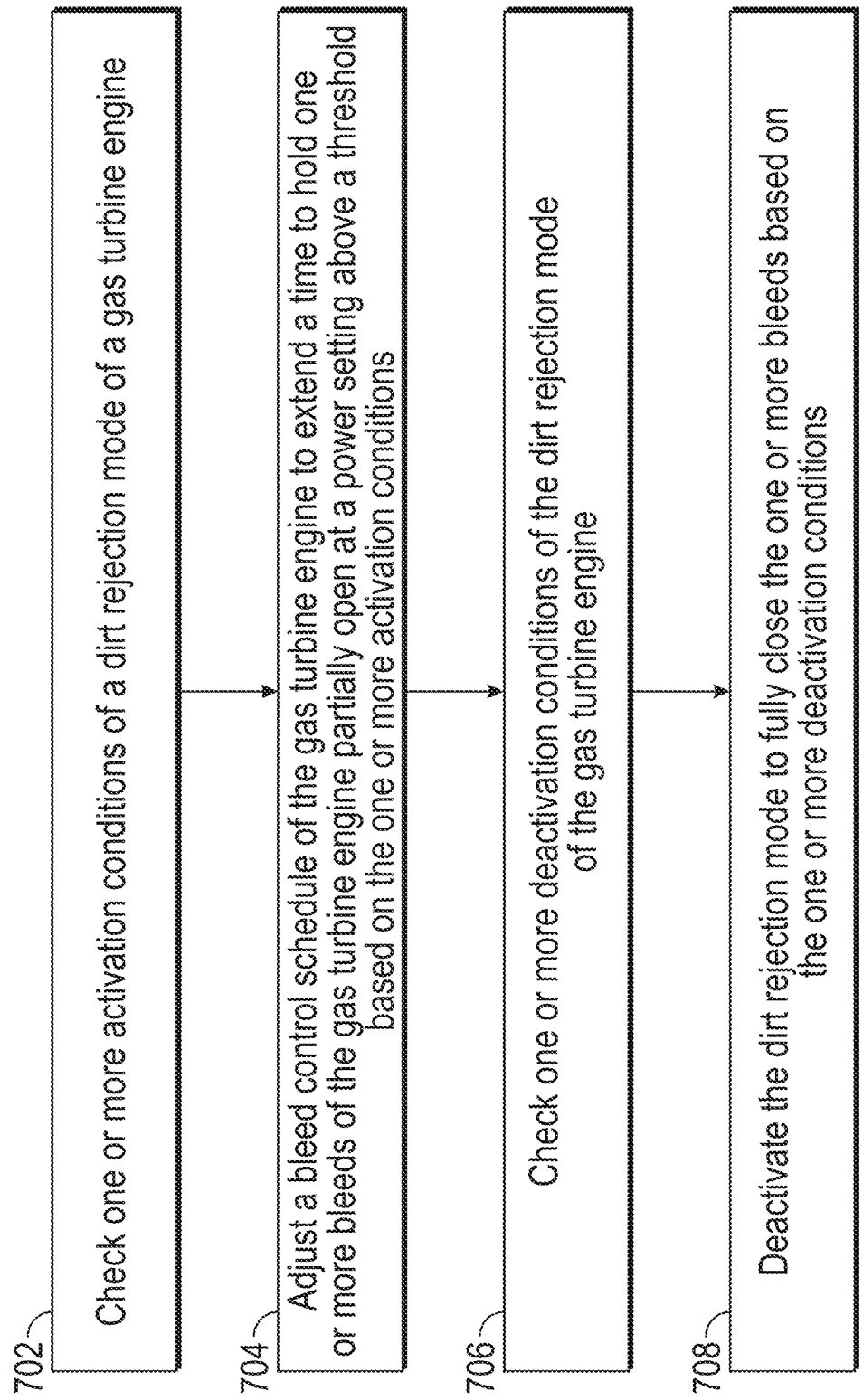
FIG. 8 is a flow chart illustrating a method, in accordance with an embodiment of the disclosure.

Referring now to FIG. 8 with continued reference to FIGS. 1-7, FIG. 8 is a flow chart illustrating a method 700 of adaptive bleed schedule adjustment in gas turbine engine 20, in accordance with an embodiment. The method 700 may be performed, for example, by the dirt mitigation system 100 of FIG. 2 and the system 400 of FIG. 5. For purposes of explanation, the method 700 is described primarily with respect to the dirt mitigation system 100; however, it will be understood that the method 700 can be performed on other configurations (not depicted).

At block 702, the control system 102 checks one or more activation conditions 406 of a dirt rejection mode of dirt rejection mode logic 402 in the gas turbine engine 20. The dirt rejection mode can be activated based on meeting all of the one or more activation conditions 406 (e.g., a logical AND). The one or more activation conditions 406 can include detecting that the gas turbine engine 20 is incorporated in an aircraft on the ground (e.g. weight-on-wheels equals TRUE), and an engine speed command of the gas turbine engine 20 is less than a full maximum takeoff thrust setting 502 with a thrust margin. The thrust margin can establish a limit as a derated thrust setting 504. The one or more activation conditions 406 can include confirming that the gas turbine engine 20 is not located in a production test cell, which may be determined based on an input value or an operating mode of the control system 102. One or more configuration parameters of the dirt rejection mode can be set responsive to an input from the data storage unit 116 to the control system 102.

At block 704, the control system 102 can adjust a bleed control schedule of the gas turbine engine 20 to extend a time to hold one or more bleeds 68 of the gas turbine engine 20 partially open at a power setting above a threshold 608 based on the one or more activation conditions 406, for instance, in a partially open position 610 as part of the commands 408. The control system 102 can be further configured to adjust a power setting of the gas turbine engine 20 to compensate for holding the one or more bleeds 68 of the gas turbine engine 20 partially open (e.g., increase a thrust setting by about 6 RPM). Adjusting the bleed control schedule may be further based on one or more of: an ambient air temperature, an interstage turbine temperature, an exhaust gas temperature, a derate setting, an engine speed, and a thrust specific fuel consumption of the gas turbine engine 20.

At block 706, the control system 102 can check one or more deactivation conditions 410 of the dirt rejection mode of dirt rejection mode logic 402 in the gas turbine engine 20. At block 708, the control system 102 can deactivate the dirt rejection mode to fully close the one or more bleeds 68 based on the one or more deactivation conditions 410. The one or more deactivation conditions 410 can include, for example, determining that an altitude of the aircraft is above an altitude threshold, determining that a time since activation is greater than a time threshold, and/or determining that the engine speed command of the gas turbine engine 20 is greater than the full maximum takeoff thrust setting with the thrust margin. The altitude threshold may default to a value of about 1500 feet above ground level, and the time threshold may default to a value of about three minutes to cover early takeoff conditions where higher dirt levels may be expected. Further, the one or more deactivation conditions 410 can include determining that a go-around mode is active and/or determining that a synthesized interstage turbine temperature is greater than a temperature threshold. The go-around mode may be set where an aircraft landing sequence is aborted on final approach, for instance. The synthesized interstage turbine temperature can be a modeled value of ITT to verify that adequate temperature margin exists while the bleeds 68 are in the partially open position 610. The temperature threshold can be defined with respect to the thermal pinch point 508 depending on the current derate setting.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for a gas turbine engine, the system comprising:

one or more bleeds of the gas turbine engine; and a control system comprising processing circuitry and a memory system, the memory system comprising a plurality of instructions that when executed by the processing circuitry cause the control system to:
   check one or more activation conditions of a dirt rejection mode in the gas turbine engine;
   read a default bleed control schedule from the memory system as a bleed control schedule;
   determine that both a dirt concentration is above a threshold and the gas turbine engine is within an operability limit;
   in response to determining that both the dirt concentration is above the threshold and the gas turbine engine is within the operability limit, adjust the bleed control schedule of the gas turbine engine to extend a time to hold the one or more bleeds of the gas turbine engine partially open at a power setting above a threshold based on the one or more activation conditions;
   check one or more deactivation conditions of the dirt rejection mode in the gas turbine engine; and
   deactivate the dirt rejection mode to fully close the one or more bleeds based on the one or more deactivation conditions and restore the bleed control schedule of the gas turbine engine by updating the bleed control schedule with the default bleed control schedule from the memory system.

2. The system of claim 1, wherein the dirt rejection mode is activated based on meeting all of the one or more activation conditions, and the dirt rejection mode is deactivated based on meeting at least one of the one or more deactivation conditions.

3. The system of claim 1, wherein the one or more activation conditions comprise detecting that the gas turbine engine is incorporated in an aircraft on the ground and an engine speed command of the gas turbine engine is less than a full maximum takeoff thrust setting with a thrust margin.

4. The system of claim 3, wherein the one or more activation conditions comprise confirming that the gas turbine engine is not located in a production test cell.

5. The system of claim 3, wherein the one or more deactivation conditions comprise:
   determining that an altitude of the aircraft is above an altitude threshold;
   determining that a time since activation is greater than a time threshold; and
   determining that the engine speed command of the gas turbine engine is greater than the full maximum takeoff thrust setting with the thrust margin.

6. The system of claim 5, wherein the one or more deactivation conditions comprise:
   determining that a go-around mode is active; and
   determining that a synthesized interstage turbine temperature is greater than a temperature threshold.

7. The system of claim 1, wherein the control system is further configured to adjust a power setting of the gas turbine engine to compensate for holding the one or more bleeds of the gas turbine engine partially open.

8. The system of claim 1, wherein the one or more bleeds are between a low pressure compressor and a high pressure compressor of the gas turbine engine.

9. The system of claim 1, wherein adjusting the bleed control schedule is further based on one or more of: an ambient air temperature, an interstage turbine temperature, an exhaust gas temperature, a derate setting, an engine speed, and a thrust specific fuel consumption of the gas turbine engine.

10. The system of claim 1, wherein one or more configuration parameters of the dirt rejection mode are set responsive to an input from a data storage unit to the control system.

11. A method of adaptive bleed scheduling in a gas turbine engine, the method comprising:
   checking, by a control system comprising processing circuitry and a memory system, one or more activation conditions of a dirt rejection mode in the gas turbine engine;
   reading a default bleed control schedule from the memory system as a bleed control schedule;
   determining, by the control system, that both a dirt concentration is above a threshold and the gas turbine engine is within an operability limit;
   in response to the determining that both the dirt concentration is above the threshold and the gas turbine engine is within the operability limit, adjusting, by the control system, the bleed control schedule of the gas turbine engine to extend a time to hold one or more bleeds of the gas turbine engine partially open at a power setting above a threshold based on the one or more activation conditions;
   checking, by the control system, one or more deactivation conditions of the dirt rejection mode in the gas turbine engine; and
   deactivating the dirt rejection mode, by the control system, to fully close the one or more bleeds based on the one or more deactivation conditions and restore the bleed control schedule of the gas turbine engine by updating the bleed control schedule with the default bleed control schedule from the memory system.

12. The method of claim 11, wherein the dirt rejection mode is activated based on meeting all of the one or more activation conditions, and the dirt rejection mode is deactivated based on meeting at least one of the one or more deactivation conditions.

13. The method of claim 11, wherein the one or more activation conditions comprise detecting that the gas turbine engine is incorporated in an aircraft on the ground and an engine speed command of the gas turbine engine is less than a full maximum takeoff thrust setting with a thrust margin.

14. The method of claim 13, wherein the one or more activation conditions comprise confirming that the gas turbine engine is not located in a production test cell.

15. The method of claim 13, wherein the one or more deactivation conditions comprise:
   determining that an altitude of the aircraft is above an altitude threshold;
   determining that a time since activation is greater than a time threshold; and
   determining that the engine speed command of the gas turbine engine is greater than the full maximum takeoff thrust setting with the thrust margin.

16. The method of claim 15, wherein the one or more deactivation conditions comprise:
   determining that a go-around mode is active; and
   determining that a synthesized interstage turbine temperature is greater than a temperature threshold.

17. The method of claim 11, wherein the control system is further configured to adjust a power setting of the gas turbine engine to compensate for holding the one or more bleeds of the gas turbine engine partially open.

18. The method of claim 11, wherein the one or more bleeds are between a low pressure compressor and a high pressure compressor of the gas turbine engine.

19. The method of claim 11, wherein adjusting the bleed control schedule is further based on one or more of: an ambient air temperature, an interstage turbine temperature, an exhaust gas temperature, a derate setting, an engine speed, and a thrust specific fuel consumption of the gas turbine engine.

20. The method of claim 11, wherein one or more configuration parameters of the dirt rejection mode are set responsive to an input from a data storage unit to the control system.

* * * * *